No. 865,342. PATENTED SEPT. 3, 1907.
J. M. HUSSEY.
APPARATUS FOR DESICCATING EGGS.
APPLICATION FILED MAR. 8, 1907.
10 SHEETS—SHEET 1.
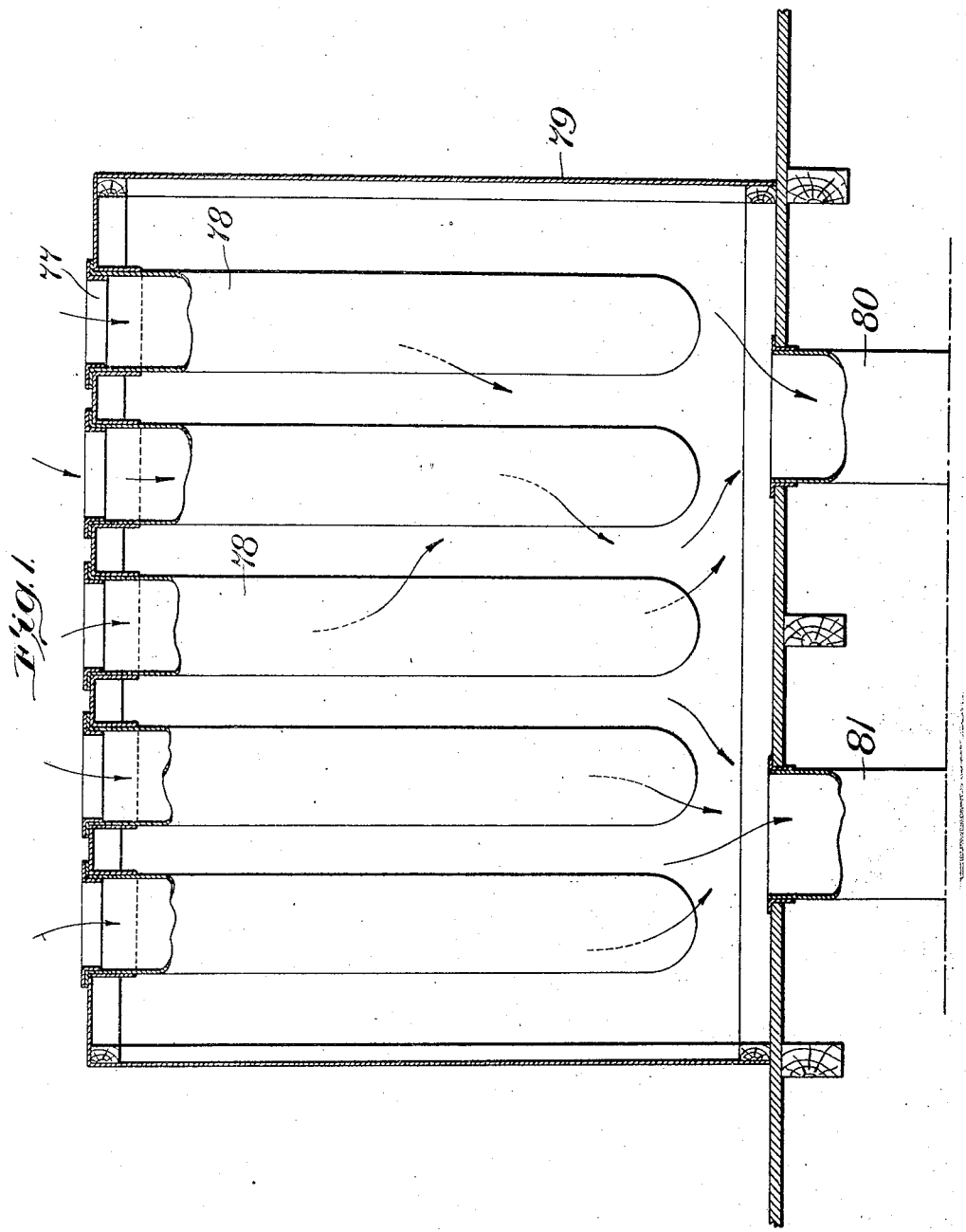

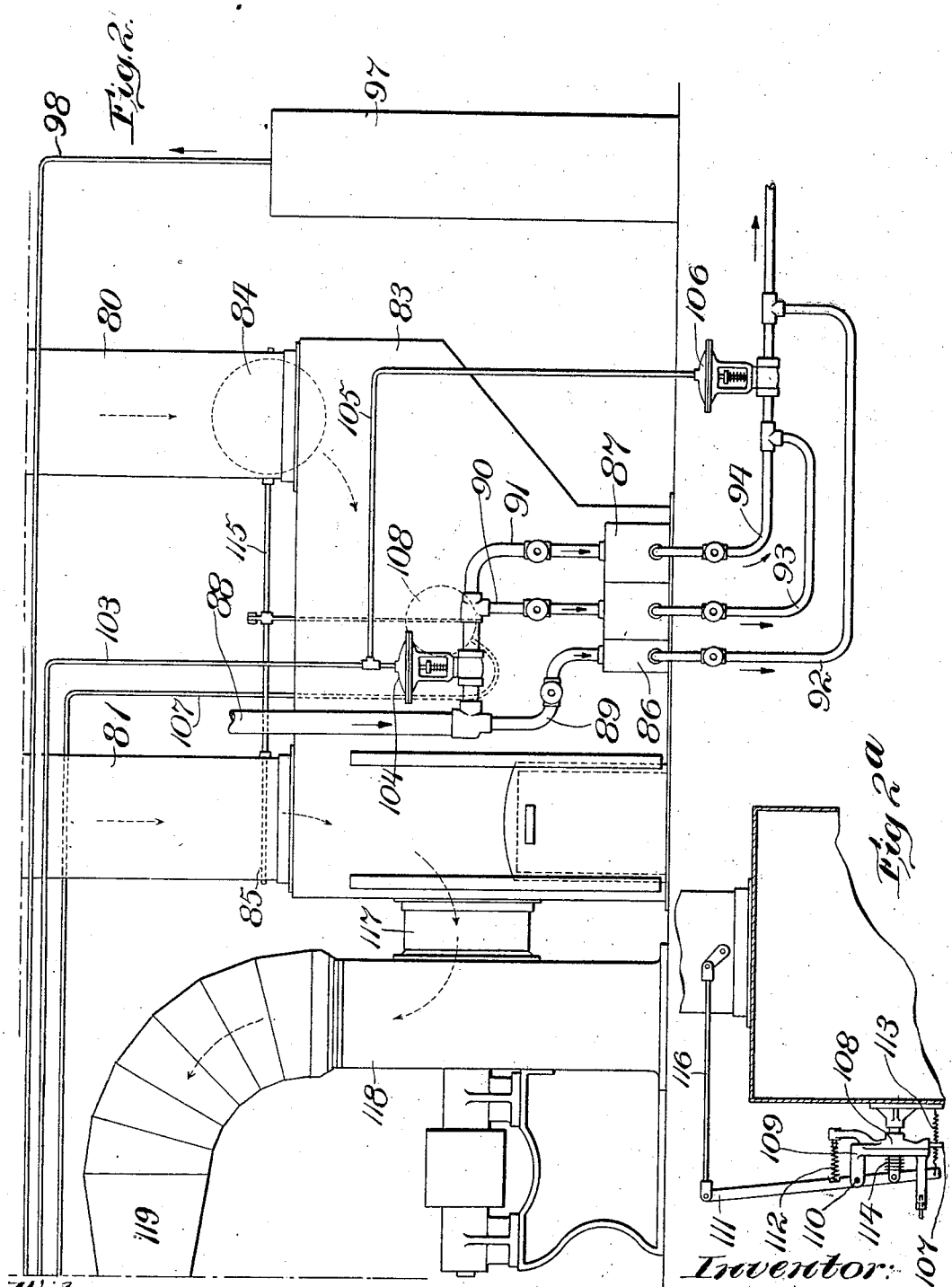

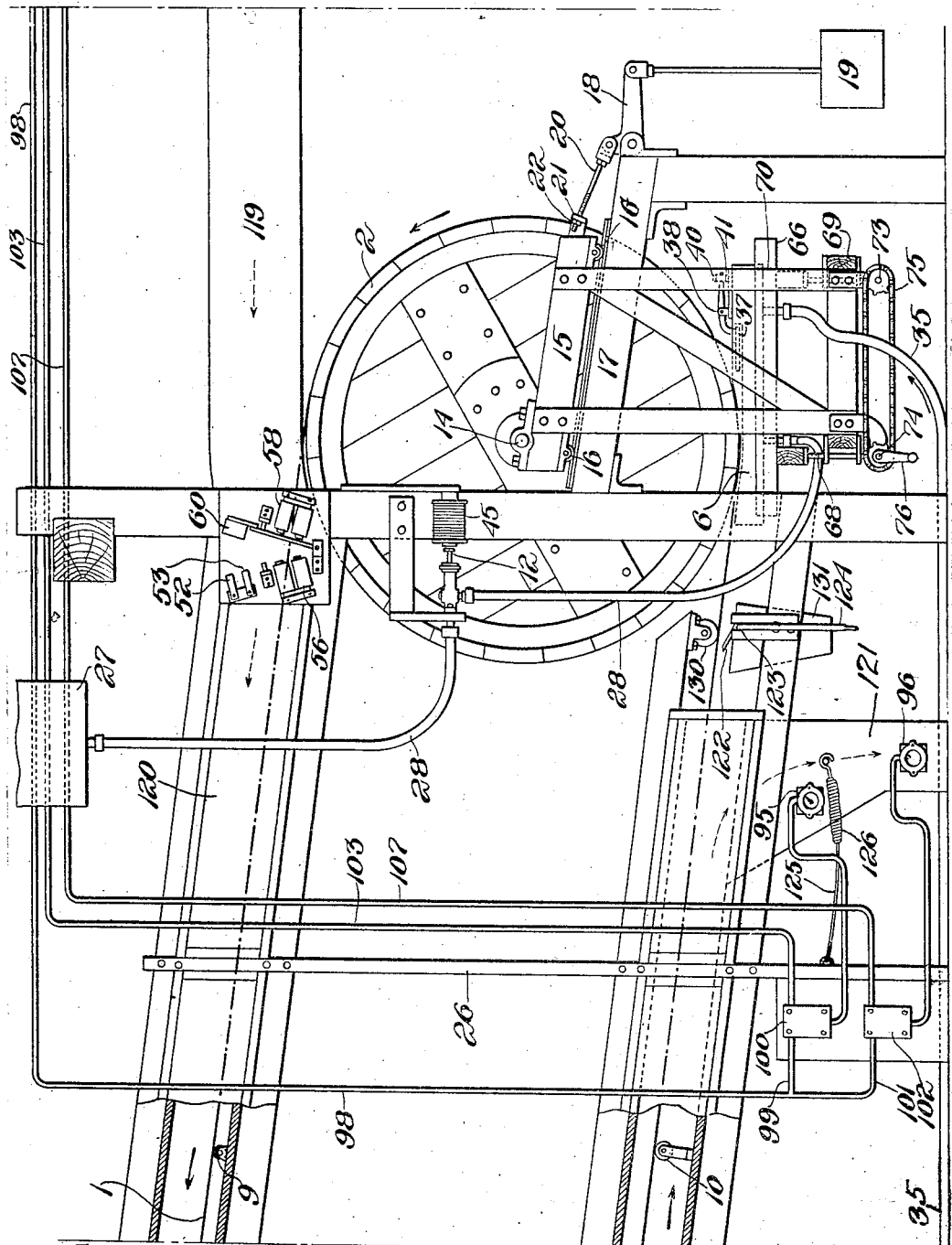

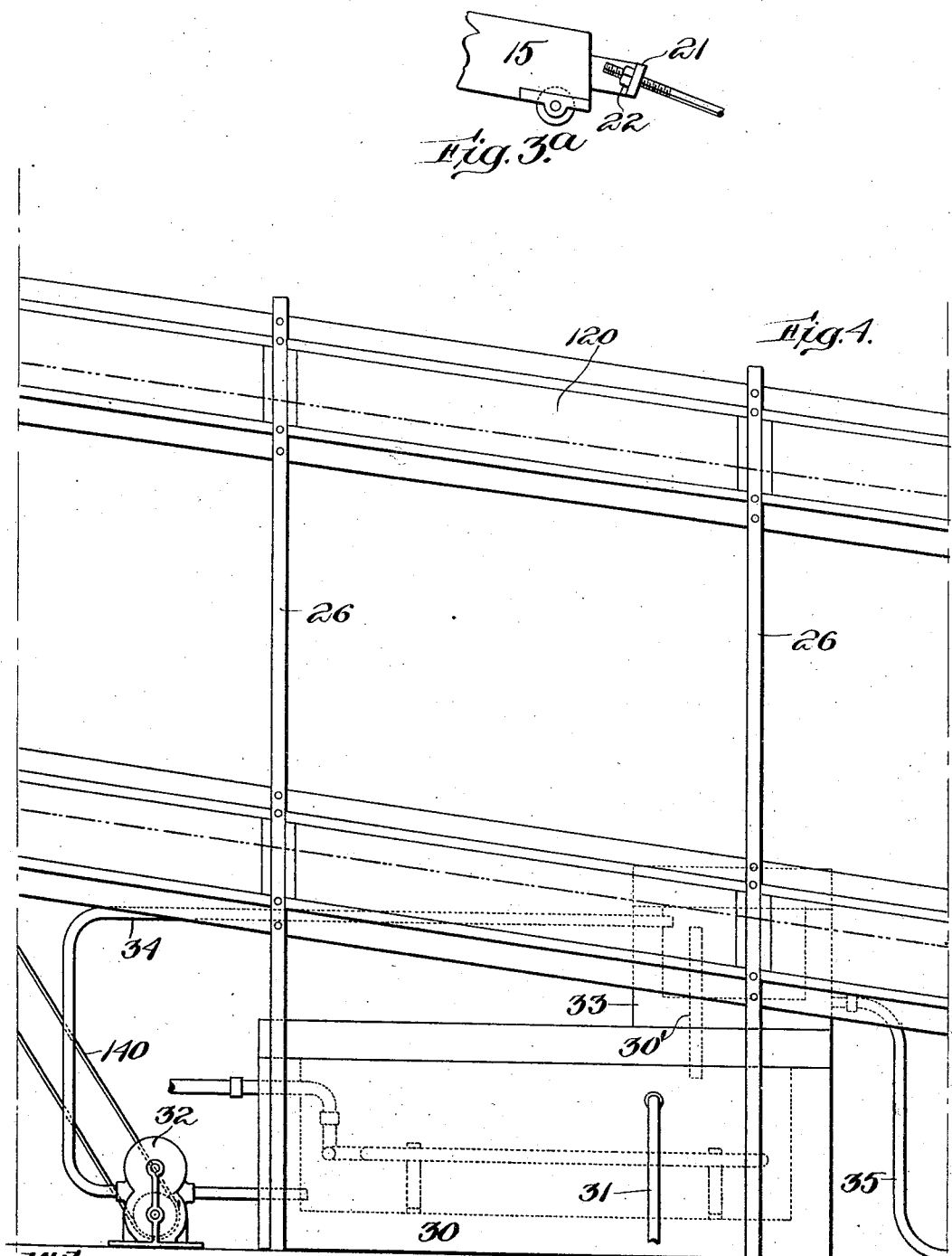

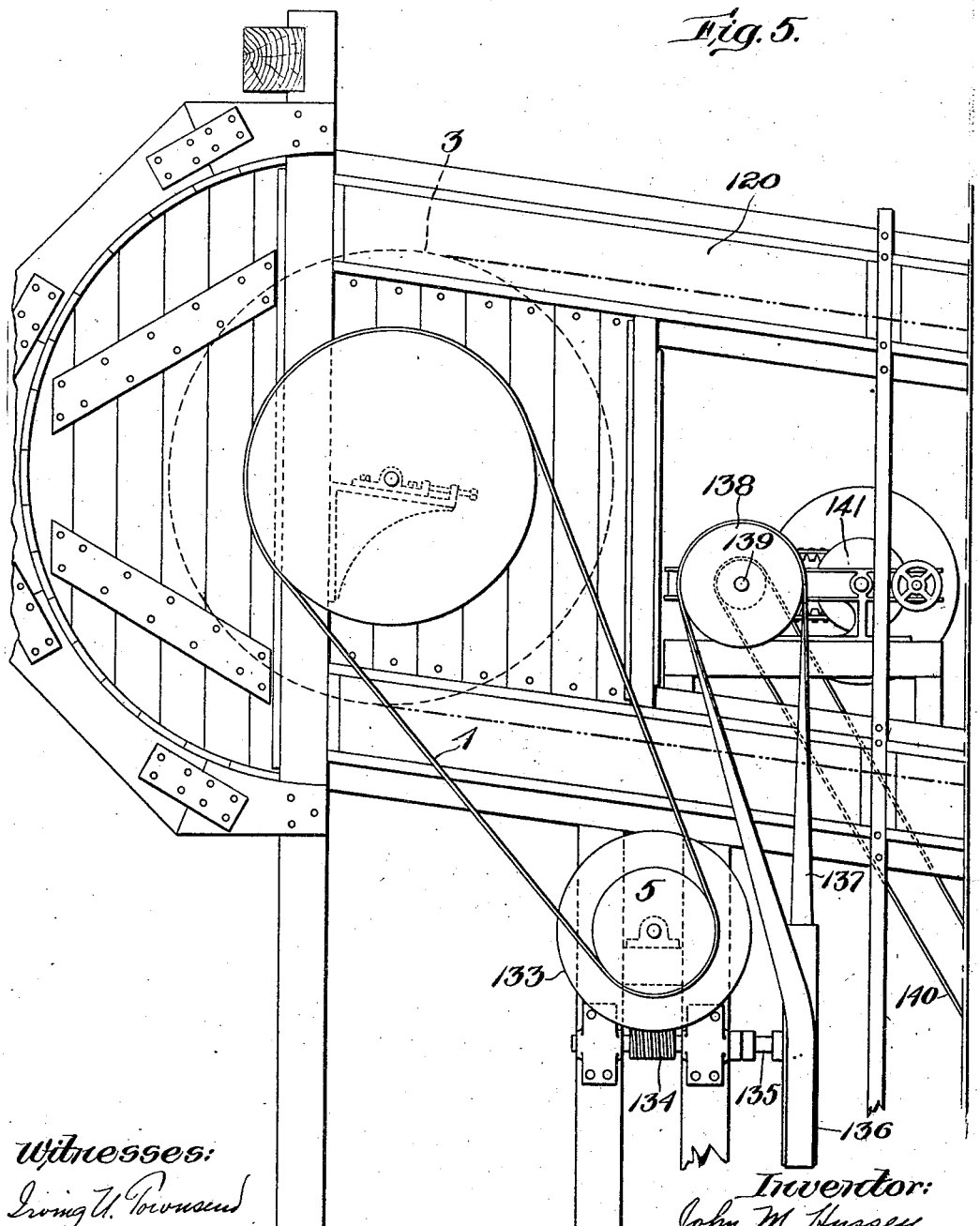

No. 865,342. PATENTED SEPT. 3, 1907.
J. M. HUSSEY.
APPARATUS FOR DESICCATING EGGS.
APPLICATION FILED MAR. 8, 1907.
10 SHEETS—SHEET 8.
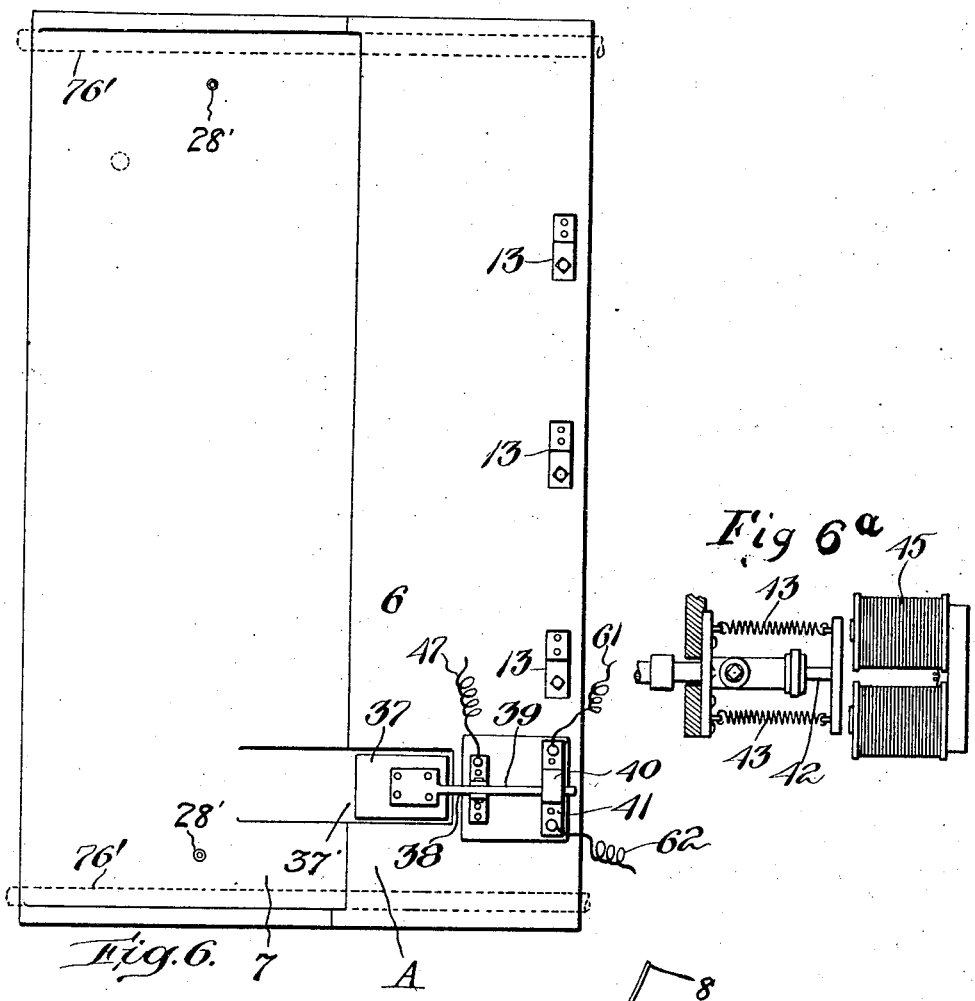
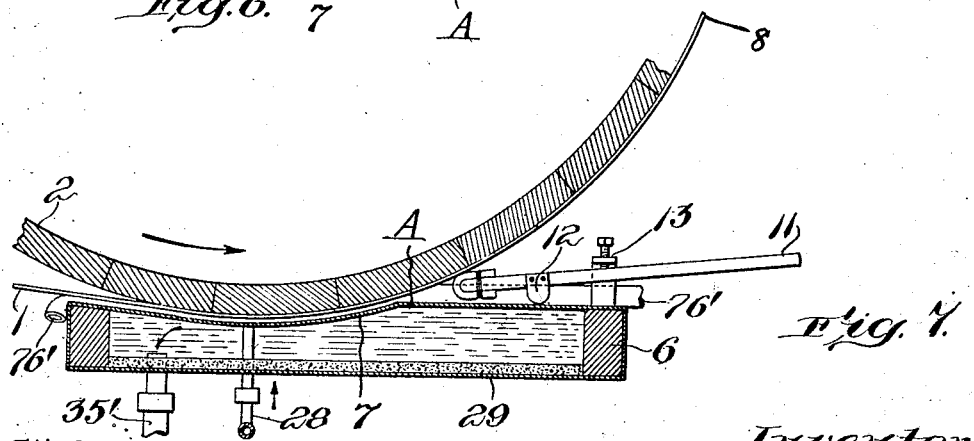
Witnesses:
Irving U. Townsend
Robert H. Kammler.
Inventor:
John M. Hussey
by Emery and Booth
Attorneys.

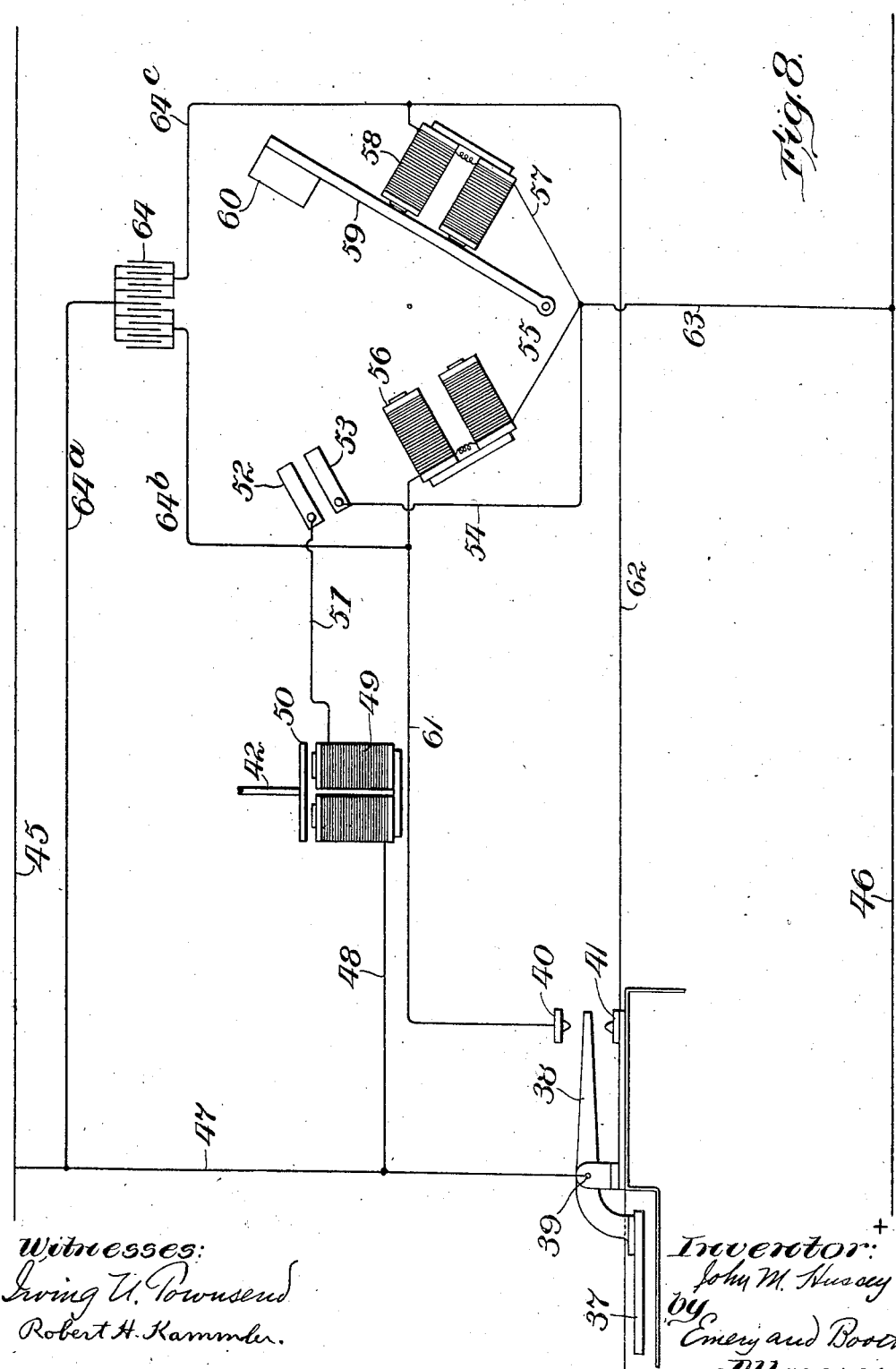

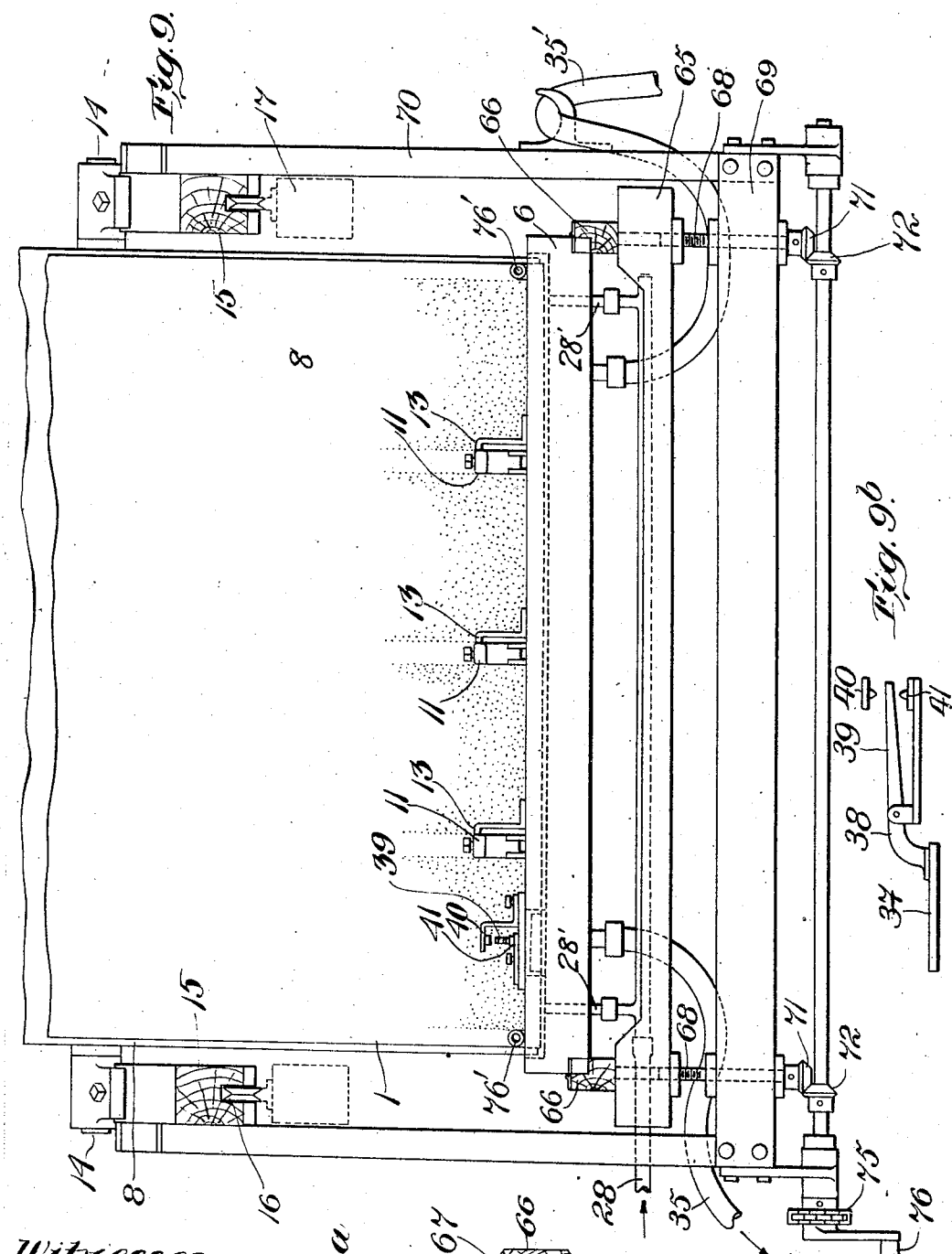

No. 865,342. PATENTED SEPT. 3, 1907.
J. M. HUSSEY.
APPARATUS FOR DESICCATING EGGS.
APPLICATION FILED MAR. 8, 1907.
10 SHEETS—SHEET 9.
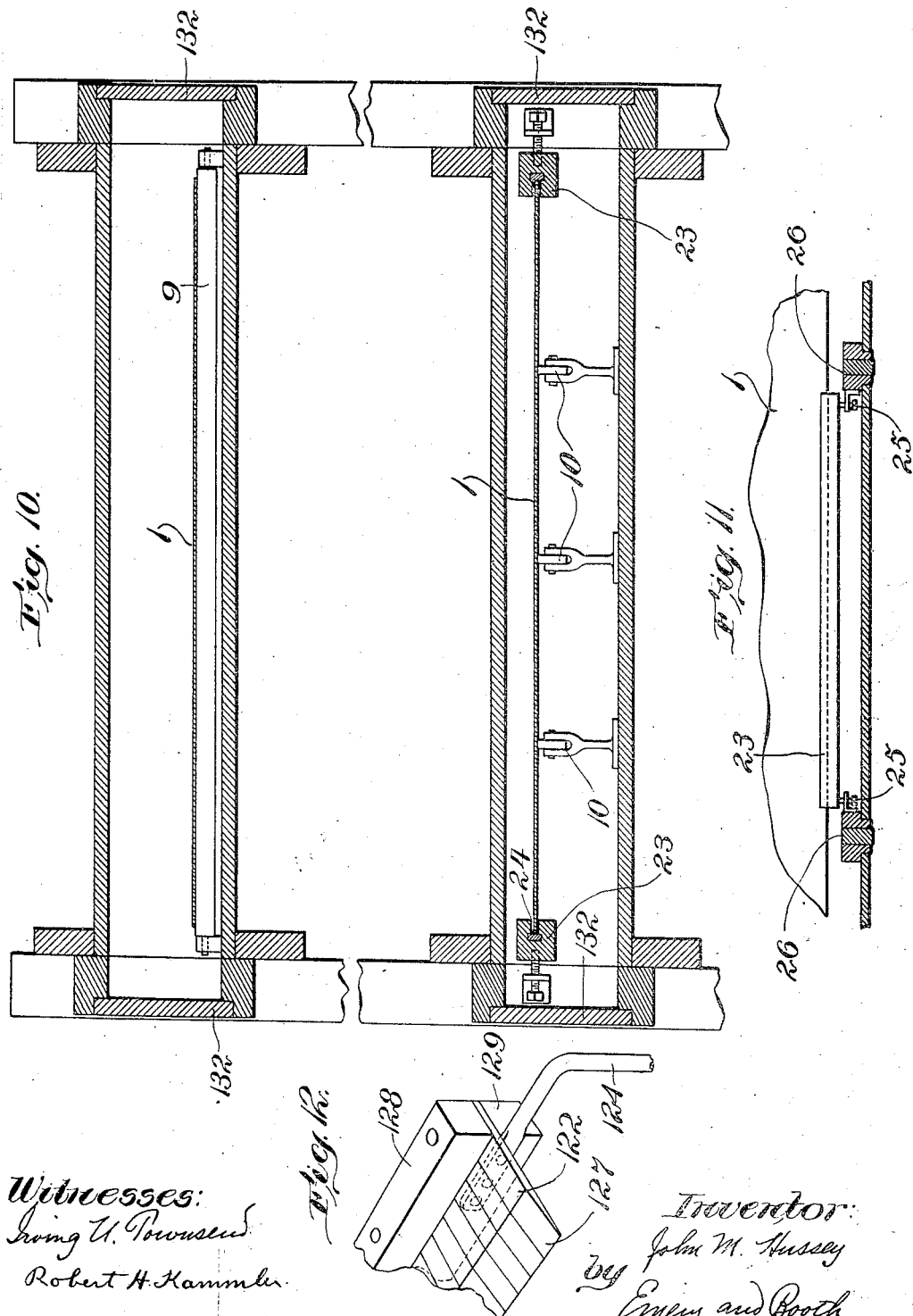
Witnesses:
Irving U. Townsend
Robert H. Kammler
Inventor:
John M. Hussey
by Emery and Booth
Attorney.

No. 865,342. PATENTED SEPT. 3, 1907.
J. M. HUSSEY.
APPARATUS FOR DESICCATING EGGS.
APPLICATION FILED MAR. 8, 1907.
10 SHEETS—SHEET 10.
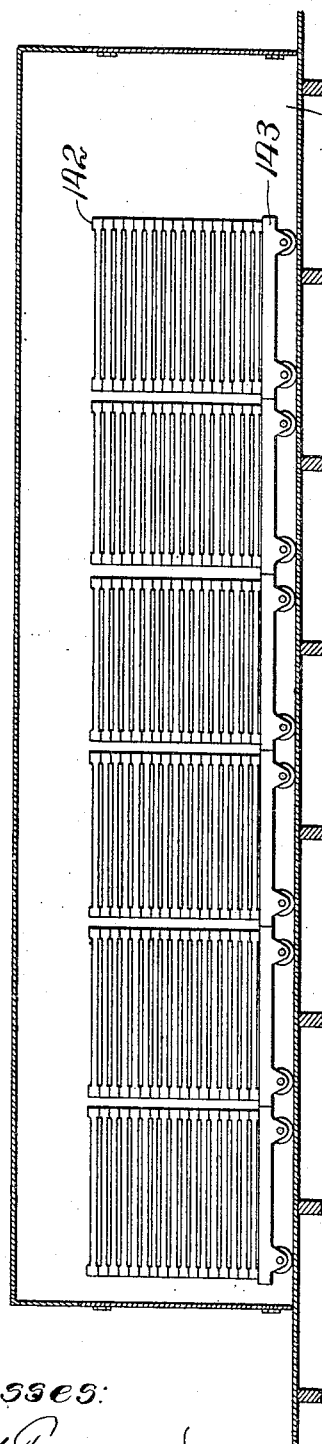
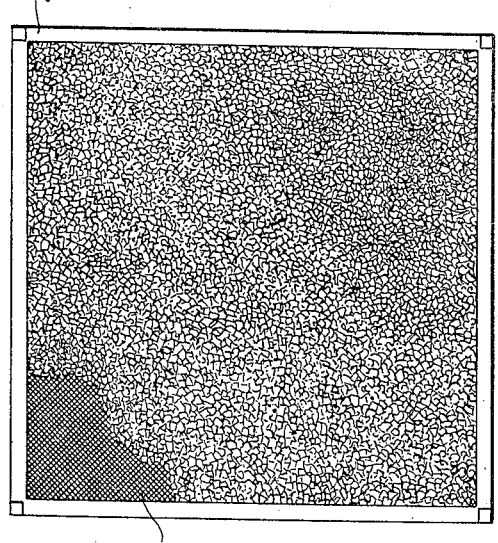
Witnesses:
Irving U. Townsend
Robert H. Kammler.
Inventor:
John M. Hussey
by Emery and Booth.
Attorneys.

UNITED STATES PATENT OFFICE.

JOHN M. HUSSEY, OF CAMBRIDGE, MASSACHUSETTS.

APPARATUS FOR DESICCATING EGGS.

No. 865,342.　　　　Specification of Letters Patent.　　　　Patented Sept. 3, 1907.

Application filed March 8, 1907. Serial No. 361,225.

*To all whom it may concern:*

Be it known that I, JOHN M. HUSSEY, a citizen of the United States, and a resident of Cambridge, in the county of Middlesex, State of Massachusetts, have invented an Improvement in Apparatus for Desiccating Eggs, of which the following description, in connection with the accompanying drawings, is a specification, like letters on the drawings representing like parts.

This invention relates to apparatus for desiccating eggs. To prepare the egg contents for the formation of the film hereinafter referred to, I may proceed in any usual way, employing either the whites separately, the yolks separately, or preferably a mixture of whites and yolks, but preferably stirring the egg batter into a condition of uniform liquidity without, however, frothing the batter.

In accordance with my invention and in order to secure the best results, I provide a belt which is preferably disposed in a plane that is nearly horizontal or is not so inclined as that the film of egg will run thereon and become uneven. It is highly desirable that each film of material received upon the belt be as thin as possible. While I do not attempt accurately to specify the actual thickness in practice, yet a film that approximates in thickness the film of a soap bubble is highly desirable and the nearer this is approached the more satisfactory is the result. Such a film when received upon a belt disposed as stated becomes thoroughly dried if the belt be of sufficient length or move sufficiently slowly, so that as the belt is returned to the egg supply, the second layer is superimposed upon a dry, hard, non-viscid surface and does not adhere thickly to the sticky mass. It is desirable that the mass of egg supply with which the belt comes in contact should be of the minimum extent so that there should be the least possible exposure of the egg supply to the air and also so that an egg film will be in contact with the egg supply, to receive thereon a second film, for the minimum length of time. In this manner, any desired number of films may be superimposed upon each other, to any desired extent as, for example, ten to fifteen, each film being thoroughly dried before another is received thereon. When a sufficient number of films have been superimposed upon the belt, any suitable mechanism may be brought into action to remove the resultant layer, which upon removal assumes the form of laminated flakes, each of which is of uniform thickness by reason of the fact that each of the films is uniform in thickness and is thoroughly dried before another is added thereto besides having other characteristics not herein pointed out, as the novel product resulting from the practice of my invention is not claimed in this application. It is highly desirable that each film as received upon the belt remain out of contact with exterior devices, so that it may dry as received upon the belt. Accordingly, in the present type of my invention, the egg film as received upon the belt remains untouched until it is removed by the scraper or other device employed for that purpose.

While each egg film may be dried in any desired manner, preferably I employ a current of air traveling in the direction of or contrary to the direction of travel of the belt, such current of air being preferably heated so as to dry each film as rapidly as possible.

In order that the principles of the invention may be fully understood, I have illustrated one type or embodiment of the apparatus in the accompanying drawings, wherein Figure 1 is a side elevation, partially in vertical section, of one form of mechanism for straining the current of air employed to dry the egg; Fig. 2 is a side elevation of air heating mechanism and means for controlling the same; Fig. 2ª is a detail representing one form of means for operating a valve of the air heating mechanism; Fig. 3 is a side elevation of one of the drums whereon the egg receiving belt is mounted together with a portion of such belt and the preferred mechanism for supplying egg to the belt. Fig. 3ª is a detail representing means for adjusting the belt; Fig. 4 is a side elevation of the intermediate portion of the belt and portions of the mechanism adjacent thereto; Fig. 5 is a side elevation of the drum for supporting the belt at the end thereof opposite that shown in Fig. 3, and preferably employed to drive the belt, a portion of which is here shown together with the belt driving mechanism; Fig. 6 is a plan view of the receptacle whereto egg is delivered and from which it is taken in a film by the belt; Fig. 6ª a detail view of valved means to control the delivery of egg to the receptacle shown in Fig. 6; Fig. 7 is a vertical sectional view of such receptacle, the belt and the supporting drum above the same; Fig. 8 is a diagrammatic view representing an electric circuit completed when the supply of egg in the receptacle becomes excessive or falls below a desired minimum; Fig. 9 is an end elevation of a portion of the belt at the point where it receives a film thereon, and the associated parts; Fig. 9ª is a perspective detail representing one manner of supporting the egg receptacle; Fig. 9ᵇ is a side elevation of a form of float preferably used in connection with the egg receptacle; Fig. 10 is a vertical transverse section taken through the belt and its casing; intermediate the supporting drums; Fig. 11 is a view partly in horizontal longitudinal section and partly in plan of a form of side guide for the belt; Fig. 12 is a detail representing a portion of the scraper that may be employed to remove the laminated layer of egg from the belt; Fig. 13 is a side elevation of a form of final egg drying apparatus that I may employ; and Fig. 14 is a plan of one of the drying racks.

Figs. 1 to 5 inclusive may be assembled to represent the entire apparatus by placing Fig. 1 beyond Fig. 2 and Figs. 3, 4 and 5 to the left of Fig. 2 and succeeding each other in numerical order.

In that specific embodiment of my invention herein disclosed I employ a traveling belt whereto the egg is applied. In certain combinations or expressions of the invention, I am not to be limited to the employment of a belt, as will appear in the claims. In so far as such expressions of the invention are concerned, other traveling egg receiving surfaces may be employed. Since, however, I herein dry each egg film before a second film is applied thereto, I have found that a traveling belt is best adapted to my purposes as it gives an extended surface, any portion whereof is not returned for a subsequent receipt of egg until the film already deposited thereon has had full opportunity to become dried.

The belt preferably employed by me is disposed with the drying runs thereof substantially horizontal. By substantially horizontal, I mean such a disposition thereof that the egg film received thereon will not run and become uneven upon such portions. While the belt may be truly horizontal, I preferably incline the same upwards at a preferably comparatively slight angle because of the manner in which, in the present embodiment of the invention, I apply the egg to the belt. That is to say, since herein I apply the egg at or near one extremity of the under run of the belt, I incline the belt properly to apply the egg thereto and properly to confine the egg supply, but I am in no wise to be restricted to such manner of applying the egg, save as expressly stated, nor to the point at which the same is applied. Therefore, when I use the term "substantially horizontal" or the like in the claims, I contemplate such variations thereof or departures therefrom as may permit the accomplishment of the purpose heretofore stated, namely, the procuring of an egg film of substantially uniform thickness throughout and which will not run and become uneven upon the drying portions or runs of the belt.

Referring to that single embodiment of the invention disclosed in the accompanying drawings and referring more particularly to Figs. 3, 4, 5, 7 and 9, the belt whereto the egg film is applied is indicated at 1, it being suitably guided about supporting drums 2 and 3 (Figs. 3 and 5), one of said drums and herein the drum 3 being positively driven in any suitable manner as by a band 4 passing about pulley 5 (Fig. 4) to which power is applied in a manner to be more fully described. While I may so locate and arrange the belt 1 as that one or both runs thereof are truly horizontal, preferably the belt is inclined upward from the drum 2, though I am in no wise to be limited to the precise arrangement described or shown. Such upward inclination of the belt is mainly provided to permit the proper application to the belt of the egg film as will be more clearly understood by reference to Fig. 7 wherein 6 indicates an egg receiving tray of any suitable form and structure adapted to receive a sufficient supply of egg. Herein the upper surface A of said tray is shown as concaved or recessed as at 7, thus conforming substantially to the surface of the drum 2, which preferably is located at a very slight distance above the recessed portion 7 of the tray. By the described upward trend of the belt, I am enabled to apply the egg to the under run of the belt, while at the same time confining the egg to such recessed portion of the tray. I am, however, not to be limited to the application of the egg to the belt at the under run thereof, though I find such arrangement preferable. If desired, the upper run of the belt may be maintained horizontal and the lower run inclined upward toward the drum 3. This could be readily done by making the drum 2 larger than drum 3 and locating the drum so that the upper surfaces are in the same plane. In this manner, egg could be readily applied to the lower surface of the belt beneath the drum 2.

As clearly shown in Fig. 7, the egg is supplied directly to the surface of the belt. It will be observed that herein the egg is applied to a continuous or uninterrupted surface from which it may be readily removed at the proper time as will be more fully described.

Viewing Figs. 7 and 9, it will be observed that the egg is applied in a film to the belt by reason of the travel of such belt in contact with the egg, a preferably shallow supply of which is maintained in or upon the egg tray 6. The egg supply should receive a minimum extent of exposure to the air in order to prevent souring thereof. Hence the egg tray is preferably made shallow to maintain the least possible amount of egg therein. The exposed surface of egg should likewise be reduced to the minimum. Moreover, it is highly desirable that the length of time of exposure of the film upon the belt to the egg supply, thereby to receive a second film thereon, should be reduced to a minimum, because the exposure of a dried film to the egg supply tends to soften such film. I have found in practice that this injures the product. Hence, in this embodiment of the invention, I reduce to the desired minimum the zone of contact or arc of exposure of the drum 2, or rather of the belt 1 supported thereon, to the egg. The egg supply, when exposed to the air, should, for the best results, be maintained as near the freezing point as possible. By the described construction a minimum amount of egg will be taken up by the belt and the egg will be confined strictly to the surface of the belt, means being provided, as will be described, to prevent contact of the egg with either the edges of the belt or any portion of the drum 2. The belt 1 travels herein in the direction of the arrow upon Fig. 7. That portion of the belt which is passing about the lower portion of the drum 2 may be considered as the egg receiving portion of the belt.

That portion of the belt which is passing about the side or lateral portion of the drum as at 8 in Figs. 7 and 9 may be considered as the draining portion of the belt, inasmuch as if the belt does receive an excess quantity of material it is quickly drained therefrom as the belt passes from the lower to the upper run. Draining occurs only when the belt runs too fast and should not be permitted. When properly operated, the belt receives only a film of the proper thickness. The other portions of the belt may be considered to be the drying surfaces proper of the belt, and such surfaces should be sufficiently extensive or the movement of the belt should be properly regulated to permit drying of the egg thereon before the return of any portion of the belt to the drum 2.

While I am in no wise to be limited to any dimensions, I may state that in practice I have found a belt that is eighty feet from the centers of the drums 2 and 3 and four feet in width gives excellent results. It is my purpose herein to apply the egg to the belt as a film of the least possible thickness. In practice, when merely the first film is applied thereto the belt has the appearance of being merely wetted, without appreciable egg color. The more nearly such film approximates, for example, the thickness of a soap bubble film the better results are obtained.

It is one of the purposes of my invention to keep each egg film cool, as will be more fully stated.

An egg contains about 72% of water which, in the present preparation of my food product, is nearly all removed therefrom. This is accomplished most efficiently by the application of heat and this is specifically effected by the drying action of a current of heated air, that passes in contact with the egg in the condition of a film. Since, however, an egg containing moisture very rapidly deteriorates in the presence of air and heat, it is requisite that the moisture be removed from the egg as rapidly as possible. So far as I am aware, I consider myself to be the first who, recognizing the desirability of removing the moisture from the egg has accomplished this by preparing an egg film of such extreme thinness that a rapid drying is accomplished. The fatty substance in the egg becomes rapidly rancid and insoluble at 55° F. and the albumen therein coagulates at 130° F. Hence the egg upon the belt, to obtain the best results, should be maintained at a temperature not above 55° F., or if for a portion of the run of the belt, such temperature be exceeded, this portion of the run should be reduced to a minimum. Therefore, I apply the egg to the belt preferably at a temperature as near the freezing point as possible, and by applying it in an exceedingly thin film, I secure such a rapid evaporation of the moisture in the egg by a current of heated air, that the solids in the egg remain cool and at a proper temperature. By reason of my availing myself of the phenomenon of rapid evaporation, with its resulting low temperature of the substance from which the moisture is absorbed, the egg film and the belt remain cool and below a temperature that can injure the product. While in the practice of my invention, the egg film should be kept at such temperature throughout the entire run of the belt, if toward the termination of the run the temperature of the egg tends to rise above the point indicated, such portion of the run of the belt should be reduced to a minimum, and the egg film is then brought in contact with the egg surface whereby its temperature is again lowered. In order to obtain the best result I continue the evaporation throughout the run of the belt as will be more fully stated. In this manner when any portion of the belt is returned to receive thereon a second film of egg, the preceding film is dried. Heretofore a second egg layer has been placed upon the first, but the egg receiving surface has been returned so rapidly to the egg supply that a thorough drying of the first layer has not been insured and as a result such layer is of a viscid nature, so that by reason of this characteristic it takes up a layer that is thicker than itself, this operation being repeated with succeeding layers. In accordance with my invention, I dry each film so that it is not of a viscid nature when returned to the egg receptacle. The result of this is that no thicker film is taken up by any previous film than by the belt itself and in fact I find in practice that the tendency of each egg film is to take up a thinner film than that originally taken up by the belt.

The belt 1 may be of any suitable material, though in practice I find zinc to be preferable, inasmuch as it has no deleterious action upon the egg.

In order that the egg may be preserved from contamination I herein maintain the egg upon the belt from contact with other portions of the mechanism. Between the drums 2 and 3 the upper run of the belt may be supported upon its under side by means of guide rolls or other devices 9 (see Figs. 3 and 10), which may, if desired, extend from edge to edge of the belt, inasmuch as they contact therewith upon the non-egg receiving surface. It is desirable to support the lower run of the belt between the drums 2 and 3. I accomplish this effectively by providing cleared tracks extending longitudinally of the belt, in which tracks run the guide disks 10 (see Figs. 3 and 10), which may be laterally adjusted in any suitable manner as by means of a slot and screw construction. Any desired number of such disks may be provided both laterally and longitudinally of the belt, herein three disks being provided to support a belt from edge to edge thereof. Any suitable means may be provided to furnish the cleared tracks upon the belt. Herein for the purpose, I employ a series of clearing devices 11 (Fig. 7) each constructed as a lever having a depending portion 12 serving to fulcrum the same upon the upper surface of the tray 6, the forward end of the device 11 being suitably formed to clear a portion of the drum. If desired, a set screw 13 may be provided, suitably mounted upon the tray 6 to bear upon each clearing device 11 to vary the pressure thereof against the belt. It will be observed that the clearing device is readily removable from its position. Any other mechanism may, however, be employed for the purpose. If desired, the belt may be strengthened or reinforced in any suitable manner.

It is desirable that the belt be so supported that it may run truly and evenly upon the drums 2 and 3 without lateral creep. Moreover the belt should be so supported that all slack therein may be taken out, which may vary from time to time in accordance with the temperature. When the egg is removed from the belt, and preferably by a scraper as will be described, strain is thereby applied to the belt, thus giving a tendency to unevenness in the running thereof. To provide against these several contingencies, I have herein mounted the bearings 14 of the drum 2 upon a movable frame 15 preferably provided with grooved rollers 16 (see Figs. 3 and 9) received upon suitable tracks upon the frame work 17, whereby the frame 15 may be moved toward and from the drum 3 as found desirable.

In order that slack may be taken up automatically, I herein mount upon the frame work 17 a plurality of bell crank levers 18 from one arm whereof are suspended weights 19, the other arm 20 being connected to the frame 15. The belt 1 may, of course, be maintained taut in any desired manner. If the belt 1 be true, it is desirable accurately to place the axis of the drum 2 in parallelism with that of the drum 3. If on the other hand the belt be not true, this being apt to occur in a long belt, then it is necessary to place the axis of the drum 2 at a slight angle to that of the drum 3, inasmuch as such inaccuracy of the belt tends to produce a sidewise creep of the belt. This may be corrected by moving one end of the drum further from or nearer to the drum 3 while maintaining the other end of the drum fixed. In order accurately to accomplish this result, I have formed the arm 20 of each bell crank 18 as a threaded bolt adapted to engage a portion of the frame 15, as a casting 21 thereon (see Figs. 3 and 3ª), a nut 22 being provided between said casting and the frame 15. In this manner an extremely delicate adjustment of the drum 2 may be accomplished, effectively preventing sidewise or lateral creep of the belt 1.

Preferably each edge of the belt is suitably guided between the drums 2 and 3. If desired, fixed guides may be provided for the greater portion of the distance between these drums, but preferably for certain portions of such edges, and herein for that portion of each run that is approaching one of said drums, I provide an adjustable guide herein represented in Figs. 10 and 11. That is to say, the upper run of the belt upon each side thereof is preferably provided with adjustable guides as it approaches the drum 3 and the lower run of the belt is so provided with guides as it approaches the drum 2.

Referring to Figs. 10 and 11, 23 indicates a strip of any suitable material provided with a longitudinal groove 24 to receive therein the adjacent edge of the belt, such groove preferably being enlarged at the base thereof to receive a strip of raw hide or the like to contact with the belt without undue friction. The guide may be adjusted laterally in any suitable manner as by set screw 25 mounted upon any suitable part of the casing as the posts 26. In this manner the belts may be adjusted laterally or held to their true course.

Viewing Fig. 3, a suitable supply or charge of egg is contained in the receptacle 27 wherein it is maintained from exposure to the air, and is at a temperature at or near the freezing point, being maintained thereat by proper insulating material in or upon the receptacle, which may be hair felt. From this receptacle the egg is delivered by a flexible or other pipe or tubing 28 to the concaved or recessed portion of the upper surface of the egg tray 6.

In Figs. 6 and 9 I have indicated in full lines at 28' near the opposite edges of the egg tray 6 the points at which the two egg supplying pipes 28 discharge the egg batter upon the concaved upper surface of the tray. By introducing the egg batter at such points, there results a more uniform drying of the film or layer as received upon the belt. The egg receiving portion of the tray is preferably of such relatively short length in the direction of travel of the belt that the surface of the egg exposed to the air is reduced to a minimum and the length of exposure of any portion of dried film upon the belt to the egg in the tray is reduced to a minimum. I have found in practice that if a dried film be retained in the egg supply for more than a minimum exposure, it tends to soften and to become dissolved, thus injuring the product. The time of exposure of the egg in the tray 6, to the air, should be reduced to a minimum, as egg rapidly deteriorates in the presence of air. Preferably the egg tray is hollow to receive therein a cooling medium such as brine. Herein the tray is shown as insulated at the bottom with felt 29 which may be employed at the sides and ends.

While the brine may be supplied in any suitable manner to the egg tray, preferably I provide a circulating system having therein a tank 30 (see Fig. 4) adapted if desired to receive the brine from an external source through a pipe 31. If desired, this brine may be conveyed to the egg tray 6, for which purpose it may be forced by a rotary or other pumps 32 to an elevated tank 33 by means of a pipe 34, from which tank it is conveyed to the egg tray 35, a pipe 35' being provided (see Fig. 9) to return the brine to the tank 33, such pipe having a portion thereof maintained at a sufficient elevation as shown in said figure to maintain a desired level of brine in said tray. If desired, however, a second supply of brine or other cooling medium of any desired nature may be employed to be cooled by the first brine supply, in which event the cooling medium contained in the tank 33 is not mingled with the first brine supply but is cooled therefrom by passing it in sufficient proximity thereto in any desired manner. If a single brine supply be used, an overflow pipe 36 (see Fig. 4) may be employed leading from the tank 33 to the tank 30.

While the brine supply in the tray 6 may be maintained at any desired temperature, preferably it is kept at about 32° F., the egg supply upon the surface thereof being thus maintained at this temperature, so that the dried egg film is suddenly further cooled or reduced in temperature upon its return to this point at the same time that it receives another film thereon.

The moisture contained in the egg is exposed preferably in as thin films or tissues as possible to the action of the heated air current. Inasmuch as both moisture and heat favor the activity of bacterial and chemical action, it will be observed that my process is carried on in the presence of two agents, each of which must be disposed of as rapidly as possible, so far as its relation to a given portion of the egg is concerned. The objectionable chemical action is that of the oxygen on the fats and albumen. Heat liquefies the fats, thus favoring chemical action which results in the formation of margaric acid in excess and oleic acid in excess. Furthermore, even after removal of the moisture, the air acts deleteriously upon the fats and other solids of the egg, so that it is necessary to remove the product from air exposure as quickly and completely as possible. If but a single film or layer of egg were formed upon a drum or other surface and were then removed therefrom as the final product, such product would constantly receive the maximum extent of air exposure, considering particles thereof. The result is that such product is not wholly soluble in water and cannot be practically used for my purpose. I deposit a thin film of egg upon the traveling surface, remove the moisture therefrom rapidly, maintaining the film cool, and quickly cover or coat such film with a second film, thus preventing air exposure thereof, so that in the final product, which may be composed of a large number of superimposed films, one surface only of each of the two surface films are exposed to the air, and hence the action of the air upon the product is reduced to a minimum.

In the proper practice of my process the temperature of the belt and film or films thereon is at all times much below that of the air employed to remove the moisture, being desirably from about 50° to 70° lower, if the temperature of the heated air be 122° F. In all other processes of which I am aware, the temperature of the egg layer, before it is removed, closely approximates that of the heated air and hence insolubility of the product results.

By my process I am enabled to dry the egg more rapidly because I can use a higher temperature than heretofore employed and I am enabled to use a higher temperature because the egg film is so thin that the drying process acts to keep the temperature of the film down to a proper point, which preferably is below 55° F. Any temperature above 55° F. departs from the ideal condition that I have referred to. I am not, however, to be limited to the employment of any certain temperature, for during a portion at least of the run of the belt a higher temperature may be reached. My product is wholly soluble in water.

Preferably only a shallow supply of egg is maintained upon the tray 6 and, in the present embodiment of my invention, I maintain this supply at a fixed level. While this may be accomplished in various ways, I herein provide (Figs. 3, 6, 8 and 9ᵇ) a float valve 37 of cork or other suitable material. The valve 37 is located in a recess or well 37′ (see Fig. 1) communicating with the concaved portion 7 of the upper surface of the tray and extending beyond the zone of contact of the belt with the egg upon the surface A. Preferably the valve is provided with an arm 38 extending rearwardly therefrom and suitably pivoted at 39 upon the frame work, said arm 38 being of suitable conducting material and adapted to contact with terminals 40 and 41 of an electric circuit, whereby in any desired manner a valve is controlled, being either opened to admit a further supply or closed to cut off a supply of egg. Any desired form of valve may be employed for the purpose. In Figs. 3, 6ᵃ and 9 is indicated a valve stem 42 normally held in valve closing position by means of springs 43 connected at one end to the framing and at the other to a plate 44 formed as an armature of a magnet 45 forming a portion of the circuit referred to, whereby upon the closing of the circuit the valve may be opened to admit a further supply of egg to the tray 6. Such opening of the valve occurs when contact is made by the float arm 38 with the contact 40. While any desired apparatus may be employed, rendered operative by the movement of the float 37, herein the electric circuit employed for that purpose comprises line wires 45 and 46, from the first of which a wire 47 leads to the arm 38 of the float. Leading from said wire 47 is a wire 48 connected with magnet 49 adapted when energized to attract armature 50, to which is attached the valve stem 42 of the valve controlling the flow of egg to the tray. Leading from said magnet is a wire 51 connected with a bridge piece 52, and from a companion bridge piece 53 extends a wire 54 leading through wire 55 to the valve opening magnet 56. Likewise leading from said wire 54 is a wire 57 connected with the valve closing magnet 58. Pivotally mounted between said magnets 56 and 58 is an armature 59 having a bridge piece 60, so that when said armature is attracted by the magnet 56, the bridge piece 60 places the bridge pieces 52 and 53 in communication, thereby energizing the magnet 49 and attracting the armature 52 to open the valve. Leading from the contact 40 is a wire 61 leading to the magnet 56, and leading from the lower contact 41 is a wire 62 connected with the magnet 58. The wires 54, 55 and 57 are connected by the wire 63 with the line wire 46. 64 indicates a condenser in communication with the line wire 45 through the wire 64ᵃ and with the wires 61 and 62 through the wires 64ᵇ and 64ᶜ. By the described circuit, if the level of the egg in the tray falls below an established minimum, an electric circuit is established through the contact 40 whereby the magnet 56 is energized, thus attracting the armature 59, so that by means of the bridge piece 60 carried thereby the magnet 49 is energized to attract the armature 50 and open the valve that control the flow of egg to the tray. As additional egg is received by the egg tray and the level thereof rises therein, the arm 38 of the float valve is withdrawn from the contact 40 and the circuit is interrupted. Nevertheless the armature 59 remains in contact with the magnet 56, so that the magnet 49 continues to be energized until the float 37 rises so high that a circuit is established by the arm 38 of the float through the contact 41, in which event the magnet 58 is energized to withdraw the armature 59 from the deënergized magnet 56, whereby the magnet 49 is deënergized. In this position of the parts, the valve is closed by the springs 43 (Fig. 6ᵃ). I preferably provide the condenser 64, which is in circuit when a circuit is established through either contact 40 or 41, to minimize the sparking at said contacts as the arm 38 separates from either of them, thus to minimize danger of fire at such points as well as to prevent injurious action upon said contacts.

Preferably the egg tray 6 is mounted so as to be vertically adjustable, that is, toward and from the drum 2 and belt 1 thereof. While this may be accomplished in any desired manner, herein the tray is supported upon a frame 65 having thereon shouldered supporting bars 66, upon which shouldered portions the tray 6 is adapted to rest. If desired, blocks 67 (see Fig. 9ᵃ) may be hinged or otherwise connected to the bars 66 to maintain the tray in position. The frame 65 may be raised and lowered in any suitable manner, and herein by means of four threaded shafts 68 (Figs. 3 and 9) received in threaded portions of the frame 65, such shafts passing through bearings in a frame 69 that is suspended from the frame 15 by means of hangers 70, shown most clearly in Figs. 3 and 9. Each shaft 68 is provided at its lower end with a beveled gear 71 meshing with a similar gear 72 upon shafts 73 and 74, preferably connected by sprocket gearing 75 to turn in unison when power is applied to either of said shafts, as for example, by handle 76. In this manner the tray may be raised or lowered while maintaining the same truly level. By reason of the fact that the frame 69 is supported from the frame 15 carrying the drum 2, said tray and drum move in unison, thus maintaining a fixed relation.

Any suitable means may be provided to prevent the escape of the egg supply from the tray 6 at either edge of the belt 1. Herein for the purpose I have employed dams 76′ (see Figs. 6 and 9), preferably composed of highly flexible rubber tubing which rest upon the tray 6 at or near opposite edges of the belt beyond the confines of the egg film thereon, such dam conforming to the contour of the belt 1 upon the drum 2 and affording a minimum amount of friction to the movement of the belt by reason of its described nature. In this manner, contact of the egg film with the edges of the belt or with the drum 2 is effectually prevented.

In order suitably and rapidly to dry the egg film upon the belt 1, I preferably employ a current of heated air passing in contact therewith. If desired, the air may be received from the exterior of the building, wherein the apparatus is located, it entering (Fig. 1) through openings 77, from which depend porous bags 78 whereby the air may be properly strained. These bags may, if desired, be disposed within a suitable casing 79 shown in said figure. From said casing, the air may pass by a main conduit 80 or a by-pass 81 (see Figs. 1 and 2) to a casing 83 wherein a suitable heating apparatus is provided, valves 84 and 85 controlling the passage of air from said main conduit and by-pass respectively to said casing 83. Within the casing 86 is provided a steam or other heater of relatively small capacity and a steam or other heater 87 of relatively large capacity, which in reality is composed of two heaters as indicated. Each of the three heaters is under hand control as indicated, so that it may be retired from action. Steam is supplied to said heaters from any suitable source of steam supply by means of an inlet pipe 88, the steam passing by means of a pipe 89 to the heater 86 and by pipes 90 and 91 to the sections of the heater 87, exit pipes 92, 93 and 94 being provided for said heaters 86 and 87 respectively.

In order properly to control the degree of heat imparted to the air entering through the openings 77, I, in the present embodiment of the invention, employ two thermostats operating at different temperatures. In Fig. 3 is indicated a first temperature thermostat 95 and a second temperature thermostat 96, the former being adapted to be rendered operative at a lower degree of temperature. A pressure tank 97 (see Fig. 2) is provided, connected with which is a pressure supply pipe 98 communicating by pipe 99 with a valve 100 of any suitable description and by means of pipe 101 with a valve 102 of any suitable description. From said valve 100 a pressure pipe 103 leads as shown in Fig. 2 to a diaphragm valve 104 controlling the inlet of steam to the larger heater 87 and by a branch pipe 105 with a diaphragm valve 106 controlling the exit of steam therefrom, said diaphragm valve 106 being placed between the pipes 93 and 94 and the pipe 92. Communicating with the valve 102 is a pressure pipe 107 communicating (see Fig. 2) with a diaphragm chamber 108 (see also Fig. 2ª). Any suitable form of thermostatic control may be employed.

When a temperature has been reached at which the thermostat 95 becomes active, the valve 100 is opened, placing the pipes 98 and 103 in communication, so that the valves 104 and 106 are actuated to cut out the double steam heaters 87, it being understood that in the normal operation of the parts all the steam heaters are in action. If the temperature should rise to a point at which the thermostat 96 becomes active the valve 102 is actuated to place the pipes 101 and 107 in communication, thereby communicating pressure to the diaphragm chamber 108 to operate the valves 84 and 85 in the following manner. Viewing Fig. 2ª, the valve casing 109 is mounted in any suitable manner, preferably upon the casing 83. Pivotally mounted upon the valve casing as at 110 is a lever 111. Spring 112 under compression and spring 113 under tension may be employed to engage the lever 111 normally to force the same to the left viewing said figure. A rod 114 is connected to the diaphragm of the valve within the casing 109 and to the lever 111, so that when said valve is actuated the lever is forced in the direction of the arrow or to the right viewing said figure. The valves 84 and 85 are mounted upon a common shaft 115, with which shaft the lever 111 is operatively connected as by means of rod 116. Said valves 84 and 85 are mounted at right angles to each other upon said shaft 115.

In the normal working of the parts the valve 84 controlling the main conduit 80 is wide open and the valve 85 controlling the by-pass 81 is closed as indicated in dotted lines in Fig. 2. In this manner the air entering from the outside passes only through the main conduit 80 and hence is heated by reason of the fact that it passes over or in proximity to the steam heaters 86 and 87, the bases only whereof are herein indicated and which may be disposed as desirable in said casing 83 and be of any desired extent. If the temperature rise to such point that the second thermostat 96 becomes active, the lever 111 is operated in the manner described partially or fully to close, as the case may be, the valve 84 and correspondingly to partially or fully open the valve 85. If the valve 84 be partially closed, then there is a resulting mixture of air passing through the main conduit 80 over or in contact with the heater or heaters, with air entering through the by-pass 81 which does not pass over or in contact with the heater or heaters, and hence is at substantially normal temperature. It will be observed that depending upon the amount of pressure that is admitted, the lever 111 will be operated to obtain any suitable mixture of air from said main conduit or by-pass or to entirely close one or the other of them.

Leading from the casing 83 (Fig. 2) is a passage 117 communicating with the blower 118 from which the air is forced through passage 119 (see Figs. 2 and 3) to a casing 120 by which the air at the proper temperature is brought in contact with the egg upon the traveling belt 1.

While air may be heated to any suitable temperature to dry the egg film upon the belt 1, preferably I maintain it at a temperature ranging from 120° F. to 130° F. and most desirably at about 122° F. I am enabled to bring air at this temperature in contact with the egg film without injuring the same by reason of the fact that the film is so thinly disposed upon the belt 1 that the moisture is quickly dried therefrom, the solids of the egg remaining at a relatively low temperature throughout the process as has been stated. Thus, the undesirable combination of moisture in the egg in the presence of heated air is not long maintained.

Although herein the heated air, while in contact with the egg film upon the belt 1, travels in the direction of movement of said belt and hence is admitted directly to the upper run of the belt, I may, if desired, admit the heated air to travel in contact with the egg film upon the belt 1, in any desired direction or manner. I have found it preferable to feed the air in the direction of travel of the belt 1 because the highly heated air acts at once upon the film of egg as received from the egg tray, the air gradually dropping in temperature from 120° F. to about 100° F. during its travel in contact with the film upon the belt. I have found that in this manner evaporation of the moisture in the egg film is so rapid that the belt and egg are actually cold to the touch, when the process is being carried out under the best conditions. As previously stated, the film is dried and as described is in the proper condition to receive a second film upon the non-viscid surface thereof.

As shown in Figs. 3, 4 and 5, the casing 120 suitably supported upon the frame work of the apparatus, provides a passage wherein the egg belt 1 travels throughout its course excepting where in contact with the drum 2 and where the egg is removed from the belt, and likewise provides a passage for the heated air which may be discharged at the end thereof through the passage 121 (see Fig. 3).

The superposed egg films may be removed from the belt 1 in any suitable manner. Preferably I employ a scraper which normally is maintained out of contact with the belt 1 in order that the desired number of films may be superposed thereon. In Figs. 3 and 12 is shown a type of scraper 122 that may be employed for the purpose, it being herein shown as pivoted upon the frame at 123 and having a depending arm 124 with which may be suitably engaged a cord 125 having a spring section 126 therein, whereby the scraper may be brought into proper engagement with the belt 1, thereby to remove the superposed films thereon. If desired and as indicated in Fig. 12, said scraper may be formed of a series of contacting sections 127, preferably of wood or other resilient material, so that any unevenness in the belt may be met by said independently movable sections 127, each of which is secured in any suitable manner as between the members 128 and 129 of the scraper for independent movement. Preferably a roller 130 is disposed transversely of the belt 1 to contact with the non-egg receiving surface thereon and afford an abutment against which the scraper operates. The superposed films scraped from the belt may be received by any suitable receptacle as indicated by 131 in Fig. 3. Preferably and as indicated in Fig. 10, the casing 120 is provided with removable panels 132, whereby access may be conveniently afforded to the adjustable lateral guides for the belt or any other desired portion thereof.

As previously stated the belt 1 is driven from the pulley 5, said pulley being rotated by a worm wheel 133 co-axial therewith. Meshing with said worm wheel is a worm 134 upon a shaft 135 suitably mounted in the frame work and having thereon a pulley 136 about which passes a belt 137 driven by pulley 138 upon a shaft 139. The brine pump 32 may be driven by belt 140 from said pulley 138. The shaft 139 may be driven at any desired speed from pulley 141, any suitable speed changing mechanism, such as that indicated, being employed. Pulley 141 may be driven by an electric motor, preferably a separate motor and air circulating system being employed for each machine, so that each is complete in itself. It at times becomes desirable to change the speed of belt 1, because of changes in the humidity of the air or in the density of the egg that is being treated.

In stating that the moisture is removed from each film before it is returned to receive another thereon, I do not mean that absolutely all the moisture is removed therefrom, but that it is so far removed as that the film is no longer of a viscid nature and is perfectly dry to the touch. While I am not to be limited thereto, I would state that I find in practice that good results are obtained by leaving about or nearly 10% of moisture in the egg film while upon the belt. This renders such film non-viscid. The superposed films as removed from the belt crumble or break into flake form each flake being as previously described of a laminated nature, being composed of a plurality of superimposed films. Inasmuch as each film is of uniform thickness throughout, it is apparent that each flake has parallel sides or is of uniform thickness.

The indicated amount of moisture is preferably maintained in each egg film upon the belt 1 and especially in the outer layer thereof at each step in the process, because I desire the evaporation to continue until or approximately until each film is returned to receive a superimposed film. If the moisture were entirely taken from each film at a relatively considerable period before such film had returned to the egg tray, then the temperature of the egg film would rapidly rise in the presence of the heated air in the casing and the product would be rendered insoluble and otherwise objectionable.

After the product has been removed and has assumed the laminated flake form as described, it may be subjected to the final drying in any desired manner. Preferably I place the flakes upon trays 142 (Figs. 13 and 14) which may be superimposed upon trucks 143 in a chamber 144, the temperature whereof should preferably be about 100° F. more or less, whereby the moisture in the egg is reduced to about 3% to 6%. Each of said trays is separated from the adjacent trays by means of a proper air space. As the first truck is loaded with filled trays, it is rolled to the far or left hand end of the chamber 144, succeeding trucks being positioned in successive order. Thus the first truck load of trays may be removed from the far or left hand end of the chamber as indicated. The trays 142 may be of any suitable material, but preferably have a bottom of wire mesh 143, whereby the flakes may be exposed to the air at both their upper and lower surfaces. Thus substantially all the moisture is removed from the flakes, which are then carried to a room, the temperature whereof is about 40° F., where they are barreled and then subjected to a temperature of 0° F., where they may be kept indefinitely. I have found that if the egg be kept at a temperature of 70° F. it becomes insoluble, although the process be otherwise correctly carried out.

As previously stated, by rapidly drying each film before another is superimposed thereon the resulting product is rendered thoroughly and uniformly soluble in water at a normal temperature. I have found by experiments that if each layer be not so dried before another is applied thereto, that is—if the moisture in the egg be retained therein for a considerable period in the presence of air and heat, the resultant product contains many insoluble properties and becomes as it is termed "air struck".

If desired the egg charge may be composed of the whole egg, that is the whites and yolks of eggs, and any desired precentage of added yolk. While I am not to be limited to any particular percentage of added yolk, I have found twelve to fifteen percent additional yolk give satisfactory results. Thus in the ultimate product there is a better resulting color because of the added yolk as well as a richer product due to the added amount of fat.

Having thus described one type or embodiment of my invention, I desire it to be understood that although, I have employed specific terms, they are used in a descriptive and generic sense and not for the purposes of limitation, the scope of the invention being set forth in the following claims.

Claims.

1. An apparatus for desiccating eggs comprising an egg-receiving tray and an egg-receiving belt located with its under run adjacent said egg-receiving tray, so that said run of the belt may contact with the egg contents of the tray, said belt being adapted to receive the egg directly upon the outer face thereof from said tray, the upper run of said belt being maintained in a plane sufficiently approaching the horizontal to permit the drying of the egg upon said belt in an even layer, and means for supporting and driving said belt.

2. An apparatus for desiccating eggs comprising an egg-receiving tray and an egg-receiving belt located with its under run adjacent said egg-receiving tray, so that said run of the belt may contact with the egg contents of the tray, said belt being adapted to receive the egg directly upon the outer face thereof from said tray, the upper and lower runs of said belt being maintained substantially horizontal, and means to support and drive said belt.

3. An apparatus for desiccating eggs comprising an egg-receiving tray and an endless egg-receiving belt located with its under run adjacent said egg-receiving tray, so that said run of the belt may contact with the egg contents of said tray, said belt being adapted to receive the egg directly upon the outer surface thereof from said tray and supported to have the runs thereof slightly inclined upward from the egg-receiving tray, means to so support the belt, and means to drive the same.

4. An apparatus for desiccating eggs comprising an egg-receiving tray and an endless egg-receiving belt located with its under run adjacent said egg-receiving tray, so that said run of the belt may contact with the egg contents of said tray, said belt being adapted to receive the egg directly upon the outer surface thereof from said tray, the lower run of said belt being maintained in a plane slightly inclined upward from the horizontal whereby the drive or travel of the belt is slightly downward toward the egg-receiving tray, means to so support said belt and means to drive the same.

5. An apparatus for desiccating eggs comprising means to receive a liquid egg supply, an egg-receiving belt, said belt having a lower run supported above and in close proximity to said liquid egg supply, said run constituting an egg-receiving surface and supported in a plane whereby the movement of said belt toward said egg supply is slightly downward, said belt having an uprising portion or surface and an elongated substantially horizontal egg-drying surface, means for so supporting said belt and means for driving the same.

6. An apparatus for desiccating eggs comprising means to receive an egg supply, an egg-receiving belt having a portion thereof adjacent said egg supply and adapted to contact therewith and having its runs disposed substantially horizontal and arranged so that the egg-receiving surface of the belt may be preserved from external contact during a plurality of revolutions of said belt, means to so support said belt, and means to drive the same.

7. An apparatus for desiccating eggs comprising a substantially horizontally disposed belt, drums for supporting and driving the same, an egg-batter-receiving tray supported in close proximity to the under horizontally disposed run of said belt, so that the outer surface of the belt may contact with the contents of said tray and receive egg-batter therefrom, and means to adjust said tray relatively to the egg-receiving surface of said belt.

8. An apparatus for desiccating eggs comprising an egg supply, a traveling egg-receiving carrier in operative relation to said egg supply, guides for said egg-receiving carrier, and means to provide longitudinal cleared tracks upon said egg-receiving carrier for said guides.

9. An apparatus for desiccating eggs comprising means to receive an egg supply, an egg-receiving belt in operative proximity to said egg supply, means to provide longitudinal cleared tracks upon the egg-receiving surface of said belt and guide rollers contacting with said belt in said cleared tracks.

10. An apparatus for desiccating eggs comprising an egg-receiving tray, a traveling egg-receiving belt having its lower run inclined slightly from the horizontal, a pair of drums for supporting said belt, the lower run of said belt moving toward said tray and inclined slightly downwardly with respect thereto, thereby preventing escape of the egg at that edge of the tray that is approached by said belt, and means to prevent escape of the egg at the edges of the belt.

11. An apparatus for desiccating eggs comprising an egg-receiving tray, a traveling egg-receiving belt in operative relation to said tray, a pair of drums to support said belt, said tray being hollow to receive a cooling medium and having a concaved upper face, the lower run of said belt being directed slightly downward toward said tray, and flexible dams upon said tray to prevent escape of the egg at the edges of the belt.

12. An apparatus for desiccating eggs comprising an egg-receiving tray, a traveling egg-receiving carrier in operative relation thereto and yielding dams upon said tray to prevent lateral escape of the egg from said tray.

13. An apparatus for desiccating eggs comprising an egg-receiving tray, a traveling egg-receiving carrier in operative relation thereto, and dams upon said tray to prevent the escape of said egg at the edges of the belt and comprising rubber tubing.

14. An apparatus for desiccating eggs comprising an egg-receiving tray, a traveling carrier located above the same and in operative relation thereto, and expansible dams between said tray and said traveling carrier and in contact with both of them to prevent escape of the egg from said tray.

15. An apparatus for desiccating eggs, comprising an egg-batter-receiving receptacle, an egg-batter-receiving belt located with its run or runs substantially horizontal, such belt having a substantially horizontal run thereof located adjacent said egg-receiving receptacle, whereby such run may contact with the egg contents of the receptacle, a plurality of heaters, and means automatically to render one or more of them inoperative.

16. An apparatus for desiccating eggs comprising an egg batter receiving receptacle, a traveling egg receiving belt located with its lower portion thereof adjacent said batter receiving receptacle, so that such portion of the belt may contact with the egg batter in said receptacle, the said belt being adapted to receive egg batter upon its outer surface from said receptacle, means to support and drive said belt, means to subject the egg batter deposited upon said belt to the action of a heated drying medium, and means whereby the egg batter in said receiving receptacle at the point of application of the batter to the belt may be maintained at a temperature below 55° F.

17. An apparatus for desiccating eggs comprising an egg batter receiving receptacle, a traveling egg receiving belt located with its lower portion thereof adjacent said batter receiving receptacle, so that such portion of the belt may contact with the egg batter in said receptacle, the said belt being adapted to receive egg batter upon its outer surface from said receptacle, means to support and drive said belt, means to subject the egg batter deposited upon said belt to the action of a heated drying medium, and means for subjecting the egg batter while in the receiving receptacle and prior to the depositing thereof upon the belt to the action of a circulatory cooling medium.

18. An apparatus for desiccating eggs comprising an egg batter receiving receptacle, a traveling egg receiving belt located with a portion thereof adjacent said egg batter receiving receptacle, means to support and drive said belt, said receiving receptacle being located adjacent said belt near a point of support of the latter, whereby egg batter may be received upon said belt from the receptacle near such point of support of such belt, and dams to prevent contact of the egg batter with such belt support.

19. An apparatus for desiccating eggs comprising an egg batter receiving receptacle, a traveling egg receiving carrier or support located with a portion of the receiving surface thereof adjacent said egg batter receiving receptacle, so that the receiving surface of said carrier or support may contact with the contents of the said receptacle and receive batter therefrom, and supplying passages for supplying egg batter to said receptacle, said supplying passages communicating with the receiving portion of said receptacle adjacent the opposite edges of said traveling carrier or support.

20. An apparatus for desiccating eggs comprising an egg batter receiving receptacle, an egg batter receiving belt with its lower portion in proximity to said receptacle so as to receive egg batter therefrom, means for supporting and driving said belt, and automatic means for maintaining a uniform level of egg batter in said receptacle.

21. An apparatus for desiccating eggs comprising a traveling carrier or support having a surface adapted to receive a layer or layers of egg batter thereon, means to support and drive said carrier or support, an egg batter receiving receptacle located in close proximity to said carrier or support, so that the receiving surface of the latter may receive egg batter from said receptacle, means to prevent contact of the edges of the carrier or support with the egg batter, means to subject the layer of egg batter upon said carrier to the action of a heated drying medium, and means to subject the egg batter in said receptacle to the action of a cooling agent, whereby the egg batter as it is received upon the carrier or support is maintained cold and whereby the egg batter after it is received as a layer upon said carrier or support is raised in temperature by the action of said heated drying medium.

22. An apparatus for desiccating eggs comprising a traveling carrier or support having a surface adapted to receive a layer or layers of egg batter thereon, means to support and drive said carrier or support, an egg batter receiving receptacle located in close proximity to said carrier or support, so that the receiving surface of the latter may receive egg batter from said receptacle, means to prevent contact of the edges of the carrier or support with the egg batter, means to subject the layer of egg batter upon said carrier to the action of a heated drying medium, means to subject the egg batter in said receptacle to the action of a cooling agent, whereby the egg batter as it is received upon the carrier or support is maintained cold and whereby the egg batter after it is received as a layer upon the said carrier or support is raised in temperature by the action of said heated drying medium, and means automatically to control the level of egg batter in said receptacle.

23. An apparatus for desiccating eggs comprising a traveling egg receiving belt, supporting and driving means for said belt including a supporting drum, an egg receiving receptacle located in close proximity to the said belt where the latter is supported by said drum, whereby the outer surface of the belt may contact with and receive egg batter from said receptacle, said receiving receptacle being of reduced extent in the direction of travel of said belt to provide a restricted zone of contact between the receiving surface of said belt and the egg batter in said receiving receptacle, said zone of contact being less than the diameter of the receiving drum for the belt adjacent said receptacle, and dams to prevent contact of said supporting drum with the egg batter in said receiving receptacle.

24. An apparatus for desiccating eggs comprising an egg-receiving tray, a traveling egg-batter-receiving carrier supported in close proximity to the contents of said tray, and dams upon said tray to prevent lateral escape of the egg-batter from said tray.

In testimony whereof, I have signed my name to this specification, in the presence of two subscribing witnesses.

JOHN M. HUSSEY.

Witnesses:
IRVING U. TOWNSEND,
ROBERT H. KAMMLER.